United States Patent
Brochhaus

(10) Patent No.: US 9,505,396 B2
(45) Date of Patent: Nov. 29, 2016

(54) METHOD FOR STARTING A BATTERY MANAGEMENT SYSTEM

(71) Applicant: Robert Bosch GmbH, Stuttgart (DE)

(72) Inventor: Christoph Brochhaus, Aachen (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 14/532,472

(22) Filed: Nov. 4, 2014

(65) Prior Publication Data

US 2015/0127205 A1 May 7, 2015

(30) Foreign Application Priority Data

Nov. 6, 2013 (DE) .................... 10 2013 222 461

(51) Int. Cl.
- *B60W 10/26* (2006.01)
- *H02J 7/00* (2006.01)
- *H01M 10/48* (2006.01)
- *H01M 10/42* (2006.01)

(52) U.S. Cl.
CPC .......... *B60W 10/26* (2013.01); *H01M 10/482* (2013.01); *H02J 7/0004* (2013.01); *H02J 7/0013* (2013.01); *B60W 2510/244* (2013.01); *B60W 2510/246* (2013.01); *H01M 2010/4278* (2013.01); *Y02T 10/7055* (2013.01)

(58) Field of Classification Search
None
See application file for complete search history.

(56) References Cited

U.S. PATENT DOCUMENTS

| | | | |
|---|---|---|---|
| 5,606,242 A * | 2/1997 | Hull | H02J 7/0004 320/106 |
| 6,154,033 A * | 11/2000 | Palanisamy | G01R 31/3627 324/425 |
| 8,341,449 B2 | 12/2012 | Daniel et al. | |
| 2010/0182154 A1* | 7/2010 | Kawai | H01M 10/425 340/636.1 |
| 2011/0117396 A1* | 5/2011 | Yang | H01M 2/34 429/50 |
| 2011/0258471 A1* | 10/2011 | Daniel | H04Q 9/00 713/340 |
| 2012/0268069 A1* | 10/2012 | Park | H01M 10/4207 320/116 |
| 2013/0029192 A1 | 1/2013 | Oya | |

FOREIGN PATENT DOCUMENTS

| | | |
|---|---|---|
| DE | 102009045526 | 4/2011 |
| DE | 102010038886 | 2/2012 |
| DE | 102010041492 | 3/2012 |
| EP | 2180574 | 4/2010 |

* cited by examiner

Primary Examiner — John R Olszewski
Assistant Examiner — Jason Roberson
(74) Attorney, Agent, or Firm — Michael Best & Friedrich LLP

(57) ABSTRACT

A method for starting a battery management system (1) is disclosed. The battery management system includes a central controller (2) and at least one battery module (4) with a sensor controller (14) and at least one cell sensor (16) which is assigned to at least one battery cell (8). The method includes determining configuration data of each battery module (4) by the central controller (2), which configuration data comprises at least the indication of the number of cell sensors (16) assigned to each battery module (4), transmitting the configuration data by the central controller (2) to each sensor controller (14) via a communication channel (5), checking the configuration data by the respective sensor controller (14), and initializing each battery module (4) on the basis of the configuration data by the respective sensor controller (14) after successful checking.

11 Claims, 4 Drawing Sheets

METHOD FOR STARTING A BATTERY MANAGEMENT SYSTEM

BACKGROUND OF THE INVENTION

The invention relates to a method for starting a battery management system which has a central controller and at least one battery module with a plurality of battery cells and a sensor controller.

In addition, a data structure, a computer program and a battery management system, which are in particular set up to perform the method, are specified. A battery and a motor vehicle with such a battery are also specified.

Electronic controllers are used in increasing numbers in the automotive environment today. Examples of these are engine controllers and controllers for ABS or the airbag. For electrically driven vehicles, the focal point of research today is the development of powerful battery packs having associated battery management systems, i.e. controllers that are equipped with a piece of software for monitoring the battery functionality. Battery management systems ensure the safe and reliable operation, inter alia, of the battery cells and battery packs used. They monitor and control currents, voltages, temperatures, isolating resistors and further variables for individual cells and/or the entire battery pack. These variables can be used to provide management functions that increase the life, reliability and security of the battery system.

Battery management systems consist of a multiplicity of controllers on which individual software functionalities are executed. Depending on the number of battery cells, the number of sensors and the distribution of the battery modules in different installation spaces in the vehicle, this results in a controller topology with a central controller and a plurality of subordinate sensor controllers for the detection of measurement data directly at the individual battery modules. The detected data is exchanged between the controllers via a communication channel, for example a CAN bus (CAN: controller area network).

DE 10 2010 041 492 A1 discloses a method for monitoring a battery, wherein measured variables such as the voltage, the temperature or the like are detected. The security functions are implemented by modular software in programmable data processing devices.

EP 2 180 574 A2 discloses a battery management system with a central control device, a program memory device connected thereto, a data memory device and a sensor interface device. The sequence control of the battery management system is software-based.

U.S. Pat. No. 8,341,449 B2 describes a method for transmitting data within a battery management system with a battery monitoring unit, a communication bus and a central controller. The battery monitoring unit is identified by a so-called node ID which is stored in an assigned hardware component and can be called by an assigned processor. On the basis of the node ID, a network ID is generated by the processor. The sensors assigned to the battery monitoring devices transmit measurement data to the central controller using the network ID.

DE 10 2010 038 886 A1 describes a central battery controller for monitoring a plurality of spatially distributed battery modules having a plurality of battery cells. The central controller exchanges information relating to the monitoring of the voltage, the temperature and the current of the battery cells with the distributed battery modules. The number of battery cells is not predefined in the battery modules, but rather can be determined at the beginning, for example by configuration of the battery controller.

SUMMARY OF THE INVENTION

In the case of a method according to the invention for starting a battery management system, which has a central controller and at least one battery module with a sensor controller and at least one cell sensor which is assigned to at least one battery cell, the following steps are provided:
a) determination of configuration data of each battery module by the central controller, which configuration data comprises at least the indication of the number of cell sensors assigned to each battery module,
b) transmission of the configuration data by the central controller to each sensor controller via a communication channel,
c) checking the configuration data by the respective sensor controller, and
d) initialization of each battery module on the basis of the configuration data by the respective sensor controller after successful checking in step c).

According to the invention, when the battery management system is started, the configuration data are transmitted from the central controller to the sensor controllers. As a result of this, the sensor controllers can advantageously be operated using a uniform software version without a non-volatile memory needing to be used on the sensor controllers and without an individual software version needing to be provided for each sensor controller. The invention permits the support of a multiplicity of possible configurations of sensor controllers in a battery pack, since it is made possible in terms of software for each sensor controller to perform the measurement over a variable number of cell sensors, wherein each cell sensor additionally monitors a variable number of battery cells.

According to a preferred embodiment, a bit length of the configuration data transmitted in step b) is independent of the number of the cell sensors assigned to the battery module. In practice, a maximum number of cell sensors assigned to each battery module is determined in this case.

According to a preferred embodiment, the battery modules comprise in each case at least one cell sensor, to which a plurality of battery cells are assigned. In this case, the configuration data determined in step a) and transmitted in step b) of the battery module preferably comprises the indication of the number of battery cells assigned to each cell sensor.

In this case, the bit length of the configuration data transmitted in step b) is preferably independent of the number of the battery cells assigned to the cell sensor. In practice, a maximum number of battery cells assigned to any of the cell sensors is determined in this case.

According to a preferred embodiment, a checksum of the configuration data is determined by the central controller, which checksum is suitable for authenticating the transmitted data. In step b), the configuration data and the checksum are transmitted via the communication channel. In this case, the checking of the configuration data by the respective sensor controller in step c) comprises checking the checksum. The result of the check is preferably transmitted to the central controller for further diagnosis.

By way of example, all of the configuration data to be transmitted can be linked to a value by means of an XOR function. The checksum can also be formed by means of a cyclic redundancy check. In the case of the cyclic redundancy check (CRC), a bit sequence of the configuration data to be transmitted is divided by a determined generator polynomial, the so-called CRC polynomial, modulo 2, wherein a remainder remains. Said remainder is the CRC value which is attached to the configuration data to be transmitted.

As an alternative to this, the checksum can also be determined by means of a one-way function $f(x,y)$ from a defined key value and the configuration data to be transmitted. In this case, all security-relevant configuration data is advantageously transmitted in a safeguarded manner. The one-way function $f(x,y) \rightarrow z$ is in this case defined with properties such that the function value z thereof is simple to calculate and an inversion of the function is very complex and practically impossible. Examples of one-way functions such as this are found in cryptography, for example hash functions, in particular SHA-1, SHA-2 or SHA-3, or as multiplication of prime numbers.

In the case of the one-way function $f(x,y) \rightarrow z$, the value y is a key value defined by the sensor controller. The value y ensures that the same one-way function supplies different results in different controllers. Each sensor controller has its own key values and therefore uses a one-way function which is different from the others, even in the case of identical configuration data to be transmitted.

The input value x is given by the configuration data to be transmitted. The value x and the value y result in the key, that is to say the information which the cryptographic algorithm parameterizes.

Hash functions are suitable for confirming the integrity of the data. That is to say that it is practically impossible to generate, by deliberate modifications, configuration data which has the same hash value as given configuration data. Without knowledge of the calculation rule, a potential hacker cannot generate any plausible combination of configuration data to be transmitted and matching signature, with the result that tamper-proof transmission of the configuration data results.

According to a preferred embodiment, the determination of the configuration data of the battery module by the central controller in step a) is done by an evaluation of a memory content of the central controller. The configuration data can be stored, for example, in a non-volatile memory, for example a so-called EEPROM (electrically erasable programmable read-only memory), that is to say a non-volatile, electronic memory component the stored information of which can be electronically erased.

As an alternative to this, the determination of configuration data of each battery module can also be done in an initialization phase. In the initialization phase, provision can be made for the sensor controllers to transmit the information relating to the number of cell sensors assigned to each battery module to the central controller via a first communication channel. Likewise, provision can be made for the sensor controllers to transmit the information relating to the number of cell sensors assigned to each battery module to the central controller via the first communication channel. The result of the initialization phase can be stored, for example, in the non-volatile memory of the central controller, with the result that when initialization has been successfully carried out once, the configuration data can consequently be read from the memory of the central controller.

The software for the central controller is thus also configured in a flexible manner. Preferably, no fixed hardware configuration is stored in the central controller. However, the software is configured to deal with almost any number of sensor controllers and cell sensors. In practice, the maximum number of cell sensors is fixed at a defined value.

According to the invention, a data structure is additionally proposed with configuration data of battery modules. The data structure was established when one of the described methods was performed by the central controller. By way of example, the data structure is read by a sensor controller at the initialization thereof.

According to the invention, a computer program is additionally proposed, according to which one of the methods described herein is performed when the computer program is executed on a programmable computer device. The computer program may be, for example, a module for starting a battery management system. The computer program can be stored on a machine-readable storage medium, for example on a permanent or rewriteable storage medium or in association with a computer device, for example on a portable memory such as a CD-ROM, DVD, a USB stick or a memory card. In addition or as an alternative thereto, the computer program can be provided for downloading to a computer device, such as to a server or a Cloud server, for example via a data network, such as the Internet, or a communication connection, such as a telephone line or a wireless connection.

According to the invention, a battery management system (BMS) is also provided for performing one of the above-described methods, wherein the battery management system has a central controller and at least one battery module with a sensor controller and at least one cell sensor which is assigned to at least one battery cell. The battery management system comprises:

a) units for determination of configuration data of each battery module by the central controller, which configuration data comprises at least the indication of the number of cell sensors assigned to each battery module, b) units for transmission of the configuration data by the central controller to each sensor controller by a communication channel, c) units for checking the configuration data by the respective sensor controller, and d) units for initialization of each battery module on the basis of the configuration data by the respective sensor controller after successful checking in step c).

According to the invention, a battery, in particular a lithium-ion battery or nickel metal-hydride battery, is also provided, which battery comprises a battery management system and is connectable to a drive system of a motor vehicle, wherein the battery management system is designed as described above and/or is set up to perform the method according to the invention.

The terms "battery" and "battery unit" are used in the present description for "rechargeable battery" and "rechargeable battery unit" in accordance with conventional spoken usage. The battery preferably comprises one or more battery units which may comprise a battery cell, a battery module, a module string or a battery pack. In this case, the battery cells are preferably grouped together in terms of space and connected to one another in terms of circuitry, for example in series or in parallel, to form modules. A plurality of modules can form so-called battery direct converters (BDCs) and a plurality of battery direct converters can form a battery direct inverter (BDI).

According to the invention, a motor vehicle with a battery such as this is additionally provided, wherein the battery is connected to a drive system of the motor vehicle. Preferably, the method is used in electrically driven vehicles, in the case of which a multiplicity of battery cells are connected together to provide the necessary drive voltage.

The method according to the invention makes it possible to provide a uniform software state for the sensor controllers. This results in a lower expenditure in terms of testing and maintenance than in the case of creating individual software versions for all of the sensor controller configurations present. In particular, complex software-variant handling is dispensed with despite different hardware infrastructures.

A further advantage is that it is possible to perform the conversion without a non-volatile memory in the sensor controller. The non-volatile memory proves to be error-prone over the service life of the battery management system.

A further advantage is that the software state for the central controller is likewise kept generic, with the result that a lower expenditure in terms of testing and maintenance occurs than in the case of creating individual software versions for various battery pack topologies.

BRIEF DESCRIPTION OF THE DRAWINGS

Exemplary embodiments of the invention are illustrated in the drawings and explained in more detail in the description which follows.

In the figures.

DETAILED DESCRIPTION

Figure 1:
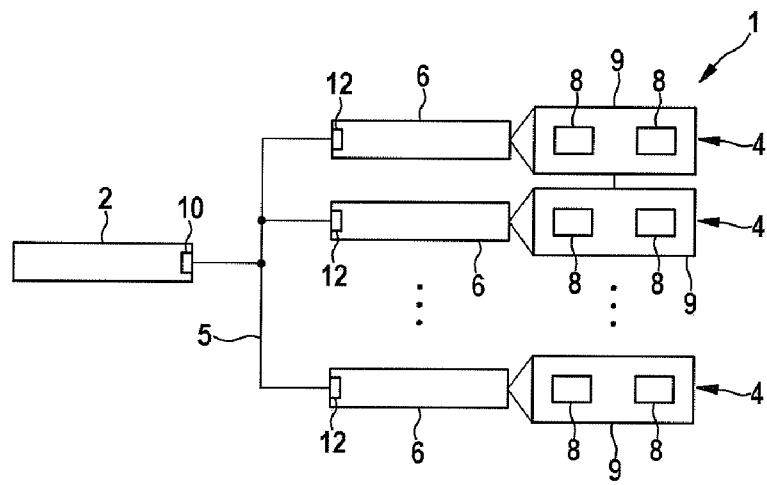
FIG. 1 shows a schematic illustration of a battery management system.

The battery management system 1 in FIG. 1 comprises a central controller 2, which can also be referred to as BCU (battery control unit), and a number of battery modules 4, which each have individual module controllers 6, which can also be referred to as CMCs (cell module controllers).

Battery units 9 which usually have a plurality of battery cells 8 are assigned to each battery module 4, wherein said battery cells are connected in series and, in some cases, additionally in parallel in order to achieve the required power and energy data with the battery. The individual battery cells are, for example, lithium-ion batteries with a voltage range of from 2.8 to 4.2 volts. The communication between the central controller 2 and the module controllers 6 takes place via a communication channel 5, for example via a CAN bus, and suitable interfaces 10, 12.

Figure 2:
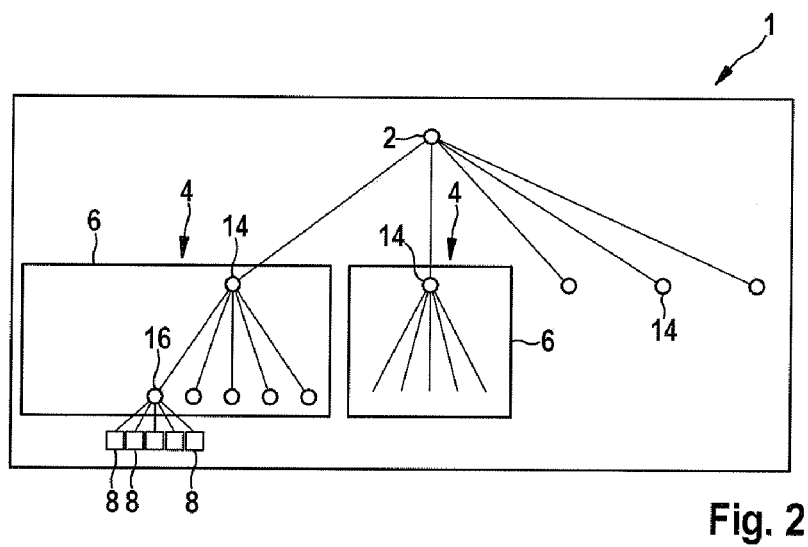
FIG. 2 shows another schematic illustration of a battery management system.

FIG. 2 shows a further embodiment of a battery management system 1 according to the invention with a central controller 2, battery modules 4, the module controllers 6 and the battery cells 8 assigned to the module controllers 6.

The module controllers 6 comprise in each case a sensor controller 14 and a plurality of cell sensors 16, wherein a plurality of battery cells 8 are assigned to each cell sensor 16. The sensor controllers 14 are not necessarily formed identically since, depending on the installation space, each of the sensor controllers 14 has a different number of connected battery cells 8. Each sensor controller 14 performs the measurements over a defined but variable number of cell sensors 16. Each cell sensor 16 monitors a defined but variable number of battery cells 8. This results in a multiplicity of possible configurations for the use of sensor controllers 14 in the battery management system 1.

Figure 3A:
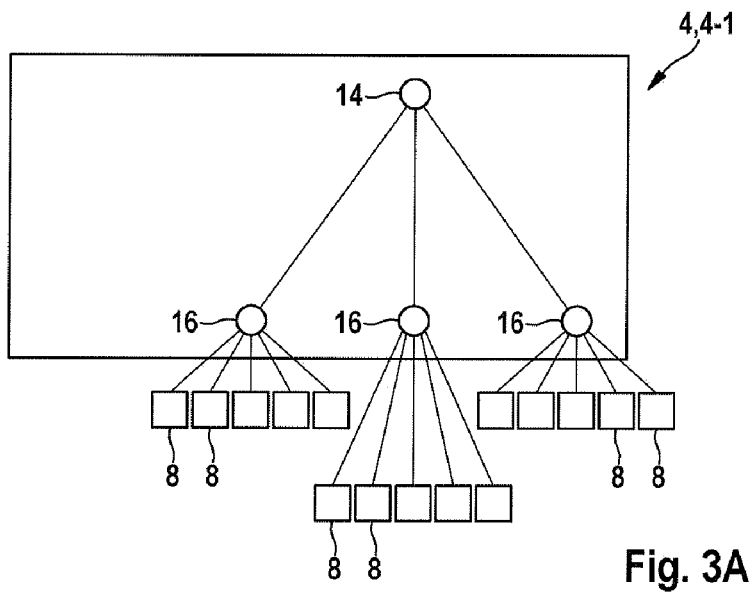
FIGS. 3A and 3B show exemplary arrangements of battery modules with different configurations.
Figure 3B:
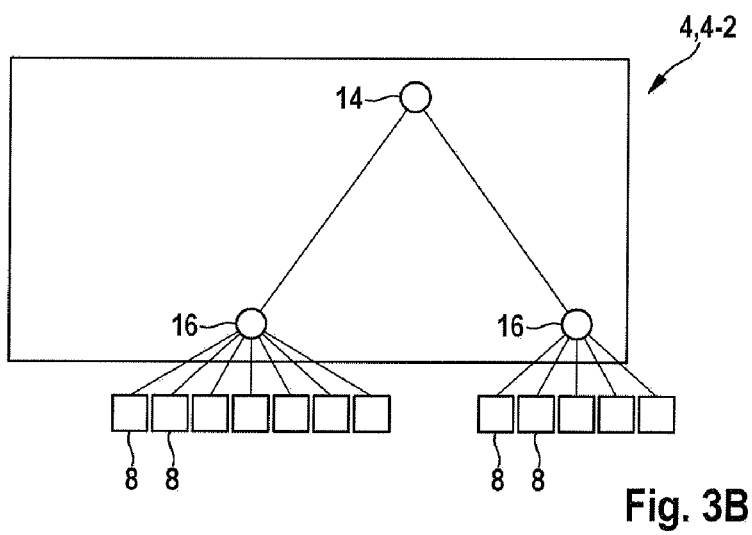

FIG. 3A and FIG. 3B show two exemplary arrangements of battery modules 4 with different configurations. FIG. 3A shows a first battery module 4-1, wherein the sensor controller 14 comprises three cell sensors 16, which are in each case connected to five battery cells 8. FIG. 3B shows a second battery module 4-2, in the case of which two cell sensors 16 are assigned to the sensor controller 14, said cell sensors being connected to seven and five battery cells 8, respectively.

It would be conceivable to create a separate item of software for each sensor controller 14, which item of software contains the configured number of cell sensors 16 or battery cells 8. It is likewise conceivable to create a software version for all of the sensor controllers 14 and to store the respective configuration to be used in the non-volatile memory, for example in the case of production of the sensor controllers 14. However, with the specified method, different numbers of cell sensors 16 and different numbers of battery cells 8 per cell sensor 16 are advantageously operable using an individual item of software in the sensor controllers 14 without a non-volatile memory being used in the sensor controllers 14. As a result of this, the expenditure for maintenance of software versions of each individual configuration of the sensor controller 14 decreases, since all possible combinations of sensor controllers 14 are provided with the identical software.

The software for the sensor controllers 14 is configured in a flexible manner. Thus, no fixed hardware configuration is stored in the sensor controllers 14. The software is configured to deal with almost any number of cell sensors 16, wherein, in practice, the number of cell sensors 16 is fixed to a maximum value x. In addition, the software is developed such that the number of battery cells 8 per cell sensor 16 is freely selectable, wherein, in practice, a maximum value y is assumed.

When the software is started, no information about the configuration of the hardware of the sensor controller 14 is yet available to the individual sensor controllers 14. When the battery management system 1 is started, the complete hardware configurations of the individual sensor controllers 14 are instead available to the central controller 2. Each individual sensor controller 14 obtains its configuration data via the communication channel 5. Once the configuration data has been obtained, each sensor controller 14 has enough information relating to its respective configuration to perform measurements, in particular to determine the number of connected cell sensors 16 and battery cells 8. Each configuration of the sensor controller 14 is individually sent with the configuration data from the central controller 2 to the corresponding sensor controller 14. For transmission, a byte stream is formed from the following data:

identification of the sensor controller 14 (for safeguarding that the sensor controllers 14 obtain the correct configuration), number of connected cell sensors 16 for the addressed sensor controller 14, number of connected battery cells 8 (per cell sensor 16), number of connected temperature sensors, checksum, for example calculated as XOR function over the preceding bytes.

Figure 4:
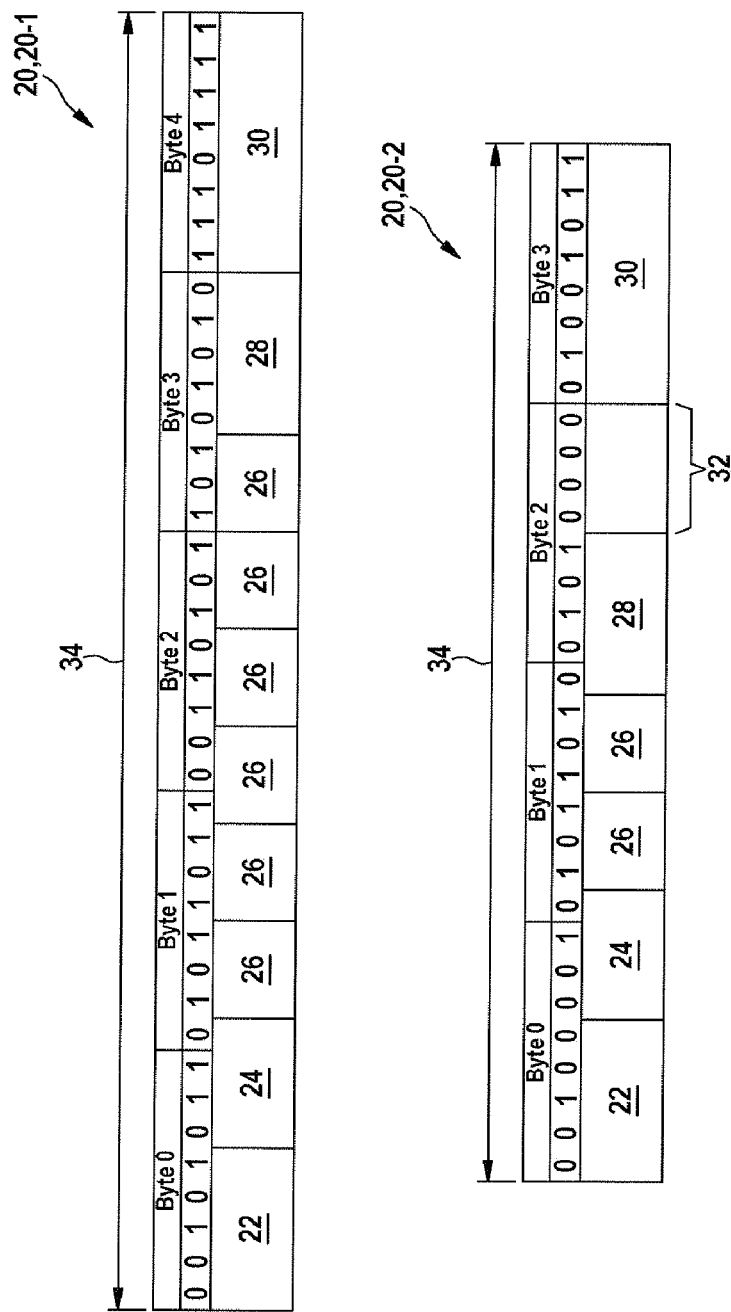
FIG. 4 shows examples of data structures with configuration data.

FIG. 4 shows examples of data structures 20 with configuration data of this type. The data structures 20 comprise a first data field 22 for an identifier of the sensor controller 14, a second data field 24 for a number of cell sensors 16, third data fields 26 for numbers of battery cells 8 assigned to the cell sensors 16, fourth data fields 28 for a number of temperature sensors and a fifth data field 30 for a checksum. The data structures 20 have a bit length 34 which can be specified as a number of bits or bytes.

The first illustrated configuration data relates to a sensor controller 14 with identifier 00101 (00101=5) which has six cell sensors 16, wherein the following numbers of battery cells are assigned to the six cell sensors 16: 5, 5, 4, 6, 5, 5. Ten temperature sensors are present. The checksum is formed as an XOR function over the preceding bytes, XOR (00101011; 01011011; 00110101; 10101010)=11101111. The first data structure 20-1 has a bit length 34 of 5 bytes.

The second illustrated configuration data relates to a sensor controller 14 (identifier 4) with two cell sensors 16, six battery cells 8 per cell sensor 16 and five temperature sensors. The checksum is formed as an XOR function over the preceding bytes, XOR (00100001; 01011010; 01010000)=01001011. The second data structure 20-2 has a bit length of 4 bytes. The second data structure 20-2 comprises a free region 32 which is due to a uniform bit length 34 of the data structures 20 and illustrates the fact that, in the case of the second data structure 20-2, only two cell sensors 16 are present although a maximum of three cell sensors 16 would be possible in this case.

The procedure is safeguarded by means of the checksum so that each sensor controller 14 also obtains the correct configuration data. The correct initialization of the sensor controllers 14 is a prerequisite for the correct functioning of the battery management system 1. Errors during transmission of the configuration data are identified and notified to the central controller 2.

For this purpose, each sensor controller 14 evaluates the data once the configuration data has been received and checks the checksum. If the checksum and the identifier (ID) of the addressed sensor controller 14 are correct, the sensor controller 14 configures its connected cell sensors 16 according to the configuration data. An item of positive feedback is sent to the central controller 2. In the event of a failed check of the configuration data, the sensor controller 14 is not initialized and an item of negative feedback is sent back to the central controller 2.

In order to perform a plausibility check on the configuration, each sensor controller 14 checks whether the number of cell sensors 16 transmitted by the central controller 2 is correct. For this purpose, each sensor controller 14 initializes the cell sensors 16. If the initialization fails, an incorrect number of cell sensors 16 are connected. Additionally, the sensor controller 14 performs a measurement and checks the measured cell voltages. As a result, it is possible to check whether a wrong number of battery cells 8 was transmitted by the central controller 2. Battery cells 8 which are not connected but are configured supply a voltage in the vicinity of 0 V. The result of the plausibility check is transmitted to the central controller 2 for further diagnosis.

To verify the configuration, the central controller 2 collects all of the measured values from the sensor controllers 14. Verification of the transmitted hardware configuration is now performed by it being checked whether the expected number of cell voltages or temperatures was transmitted by the respective sensor controllers 14.

Figure 5:
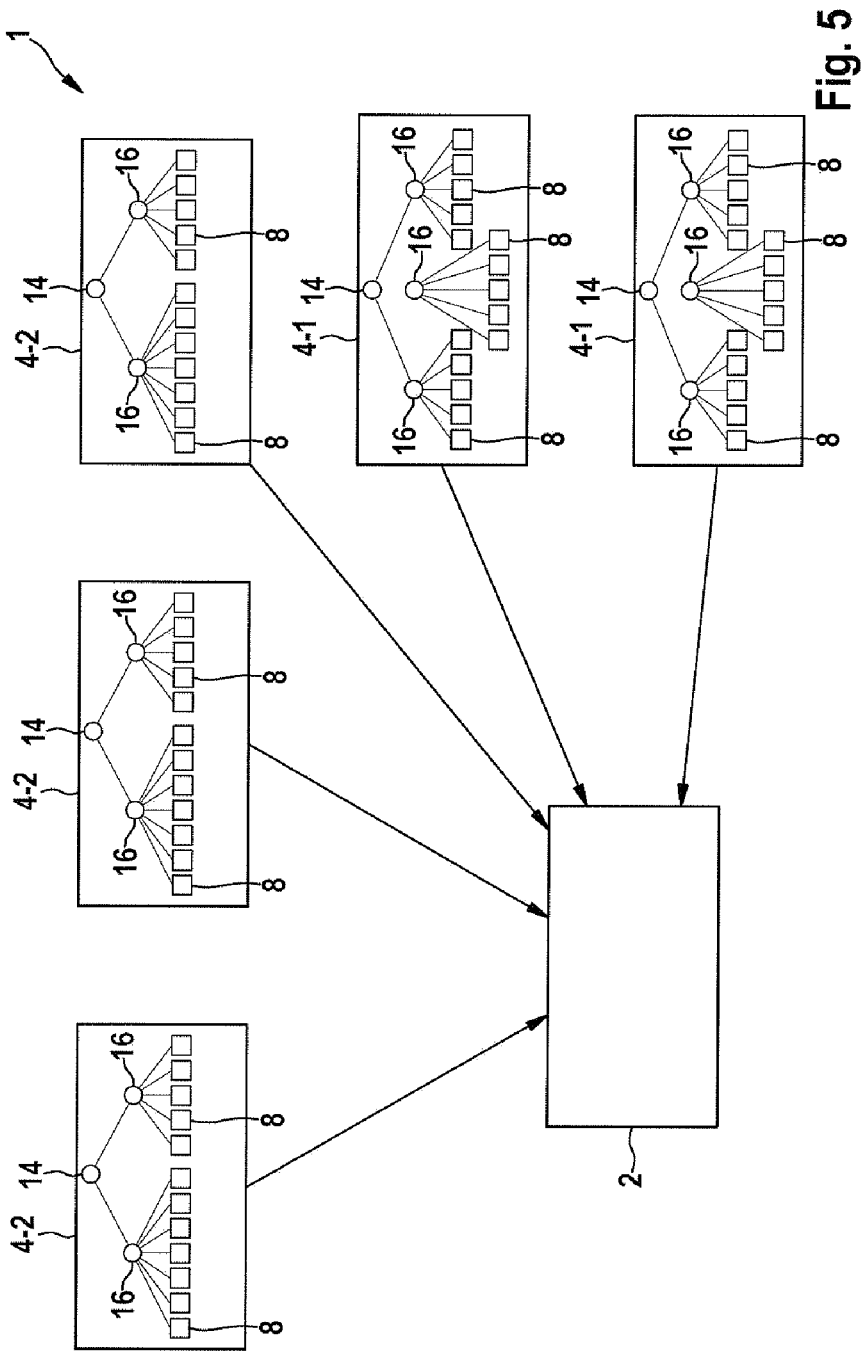
FIG. 5 shows an exemplary initialization process of a system topology.

FIG. 5 shows an exemplary initialization process of a system topology of the battery management system 1, which comprises a central controller 2, two first battery modules 4-1, which have three cell sensors 16 with in each case four battery cells 8, and three second battery modules 4-2 with in each case two cell sensors 16, wherein a first cell sensor 16 of the second battery module 4-2 has seven battery cells 8 and a second cell sensor 16 of the second battery module 4-2 has five battery cells 8.

When the central controller 2 and the sensor controllers 14 are started, the sensor controllers 14 transmit their configuration to the central controller 2, as indicated by the arrow. After all of the sensor controllers 14 have transmitted the information relating to the connected cell sensors 16 and battery cells 8, the central controller 2 has obtained knowledge about the overall configuration of the battery management system 1. Using this information, the central controller 2 can perform the necessary battery management function.

The software for the central controller 2 is configured in a flexible manner. Therefore, no fixed hardware configuration is stored in the central controller 2. The software is configured to deal with almost any number of cell sensors 16, wherein, in practice, the number of cell sensors 16 is fixed to a maximum value z.

When the battery management system 1 is started for the first time, that is to say in an initialization phase, the central controller 2 determines the complete hardware configurations of the individual sensor controllers 14. In order to avoid manipulations and for reasons of security, the transmission of the configurations of the individual sensor controllers 14 to the central controller 2 can be safeguarded, for example by means of an encryption or by means of the generation of a checksum which is not easily falsifiable. The configurations can now be stored in a non-volatile memory of the central controller 2, from which they can be read during future system starts.

At various points in the above examples, only cell voltage sensors have been taken into account for reasons of simplicity. In realized battery management systems 1, additional temperature sensors and/or current sensors are added. The information from these sensors is processed in a similar manner to the cell voltage sensors.

The invention is not limited to the exemplary embodiments described here and to the aspects highlighted therein. On the contrary, a large number of modifications that are within the scope of action of a person skilled in the art are possible within the scope indicated by the claims.

What is claimed is:

1. A method for starting a battery management system (1), which has a central controller (2) and a plurality of battery modules (4) having one or more sensor controllers (14) having at least one cell sensor (16) which is assigned to at least one battery cell (8), said method comprising:
   a) determining configuration data of each of the plurality of battery modules (4) by the central controller (2), which configuration data comprises at least the indication of the number of cell sensors (16) assigned to each battery module (4),
   b) transmitting the configuration data by the central controller (2) to each sensor controller (14) via a communication channel (5),
   c) checking the configuration data by the respective one or more sensor controllers (14), and
   d) initializing each of the plurality of battery modules (4) on the basis of the configuration data by the respective one or more sensor controllers (14) after successful checking in step c);
   wherein each of the one or more sensors controllers (14) are operated using a uniform software version following initialization of each of the plurality of battery modules (4).

2. The method according to claim 1, characterized in that a bit length (34) of the configuration data transmitted in step b) is independent of the number of the cell sensors (16) assigned to the battery module (4).

3. The method according to claim 1, characterized in that the configuration data determined in step a) and transmitted in step b) of each battery module (4) comprises the indication of the number of battery cells (8) assigned to each cell sensor (16).

4. The method according to claim 1, characterized in that a checksum of the configuration data is determined by the central controller (2), in step b), the configuration data and the checksum are transmitted via the communication channel (5) and the checking of the configuration data by the respective sensor controller (14) in step c) comprises checking the checksum.

5. The method according to claim 1, characterized in that the determination of the configuration data of each battery module (4) by the central controller (2) in step a) is done by an evaluation of a memory content.

6. The method according to claim 1, characterized in that the determination of the configuration data of each battery module (4) by the central controller (2) in step a) takes place in an initialization phase.

7. The method according to claim 1, further comprising establishing a data structure (20) with configuration data of battery modules (4) by the central controller (2), and the one or more sensor controllers (14) reading the data structure (20).

8. A non-transitory computer readable medium having a computer program for performing the method according to claim 1, when the computer program is executed on a programmable computer device.

9. A battery management system (1) for performing the method according to claim 1, wherein the battery management system (1) has a central controller (2) and at least one battery module (4) with a sensor controller (14) and at least one cell sensor (16) which is assigned to at least one battery cell (8), said battery management system having a) units for determination of configuration data of each battery module (4) by the central controller (2), which configuration data comprises at least the indication of the number of cell sensors (16) assigned to each battery module (4), b) units for transmission of the configuration data by the central controller (2) to each sensor controller (14) by a communication channel (5), c) units for checking the configuration data by the respective sensor controller (14), and d) units for initialization of each battery module (4) on the basis of the configuration data by the respective sensor controller (14) after successful checking in step c).

10. A battery with a battery management system (1) according to claim 9, wherein the battery is connectable to a drive system of a motor vehicle.

11. A motor vehicle with a battery according to claim 10, wherein the battery is connected to a drive system of the motor vehicle.

\* \* \* \* \*